(12) United States Patent
Puljic (10) Patent No.: US 12,345,309 B1
(45) Date of Patent: Jul. 1, 2025

(54) GRAVITATIONAL TORQUE AMPLIFIER APPARATUS AND METHOD

(71) Applicant: Ante Puljic, Chicago, IL (US)

(72) Inventor: Ante Puljic, Chicago, IL (US)

(*) Notice: Subject to any disclaimer, the term of this patent is extended or adjusted under 35 U.S.C. 154(b) by 0 days.

(21) Appl. No.: 18/923,324

(22) Filed: Oct. 22, 2024

Related U.S. Application Data (60) Provisional application No. 63/731,024, filed on Mar. 25, 2024.

(51) Int. Cl.
| | | |
|---|---|---|
| *F16F 15/16* | (2006.01) | |
| *F03B 17/00* | (2006.01) | |
| *F16F 15/28* | (2006.01) | |

(52) U.S. Cl.
CPC ............ *F16F 15/16* (2013.01); *F03B 17/005* (2013.01); *F16F 15/28* (2013.01); *F16F 2222/12* (2013.01); *F16F 2230/0011* (2013.01); *F16F 2230/06* (2013.01); *F16F 2230/22* (2013.01); *F16F 2232/02* (2013.01)

(58) Field of Classification Search
CPC .......... F16F 15/10; F16F 15/16; F16F 15/161; F16F 15/162; F16F 15/28; F16F 2222/12; F16F 2230/0011; F16F 2230/06; F16F 2230/22; F16F 2232/02; F03B 17/005
See application file for complete search history.

(56) References Cited

U.S. PATENT DOCUMENTS

| | | | | |
|---|---|---|---|---|
| 4,873,887 A | * | 10/1989 | Andra | .................... F16F 15/161 |
| | | | | 464/24 |
| 6,663,526 B2 | * | 12/2003 | Janson | ....................... F16D 3/80 |
| | | | | 74/573.12 |
| 9,664,251 B2 | * | 5/2017 | Harby | .................... F16F 15/121 |

FOREIGN PATENT DOCUMENTS

| | | | | | |
|---|---|---|---|---|---|
| CN | 108506418 A | * | 9/2018 | ............. | F16F 15/22 |
| CN | 111120533 A | * | 5/2020 | ............. | F16D 13/58 |
| CN | 115182965 A | * | 10/2022 | | |
| GB | 604528 A | * | 7/1948 | | |

* cited by examiner

*Primary Examiner* — Adam D Rogers
(74) *Attorney, Agent, or Firm* — Nyman IP LLC; Scott Nyman (57) ABSTRACT

An apparatus is provided for a gravitational torque amplifier for improving rotational efficiency. The apparatus may include a hub, spokes, liquid transfer system, first tank and second tank. A method for using the gravitational torque amplifier for improving rotational efficiency is also provided.

17 Claims, 8 Drawing Sheets

GRAVITATIONAL TORQUE AMPLIFIER APPARATUS AND METHOD

CROSS-REFERENCE TO RELATED APPLICATION

This application claims the priority from U.S. provisional patent application Ser. No. 63/731,024 filed Mar. 25, 2024. The foregoing application is incorporated in its entirety herein by reference.

FIELD OF THE INVENTION

The present disclosure relates to a gravitational torque amplifier for improving rotational efficiency. More particularly, the disclosure relates to increasing an angular momentum of masses rotating about a rotational axis via a gravitational torque amplifier.

BACKGROUND

Inventions that harness rotational energy, such as windmills, wind turbines, and water mills, have been a part of human civilization for centuries. However, these devices often suffer from significant energy loss due to factors such as friction or gravitational forces. As a result, rotational energy devices of the prior art have struggled to fully capture and utilize the available energy. Researchers and engineers continue to explore innovative designs and materials to improve the efficiency of these energy-harvesting technologies.

Therefore, a need exists to solve the deficiencies present in the prior art. What is needed is an apparatus to improve rotational efficiency. What is needed is an invention to assist in driving an external generator. What is needed is an apparatus that uses a liquid to assist with creating a rotational force by transferring a liquid between a first tank and second tank located on spokes that rotate about a hub. What is needed is a mechanism that uses centripetal and centrifugal forces to improve a turning speed.

SUMMARY

An aspect of the disclosure advantageously provides an apparatus to improve rotational efficiency. An aspect of the disclosure advantageously provides an invention to assist in driving an external generator. An aspect of the disclosure advantageously provides an apparatus that uses a liquid to assist with creating a rotational force by transferring a liquid between a first tank and second tank located on spokes that rotate about a hub. An aspect of the disclosure advantageously provides a mechanism that uses centripetal and centrifugal forces to improve a turning speed.

Accordingly, the disclosure may feature a gravitational torque amplifier for improving rotational efficiency including a hub, spokes, and liquid transfer system. The hub may be operatively attached to a shaft that rotates about a rotational axis. The spokes may be operatively attached to and extend outwardly from the hub. The spokes may be orthogonal to a rotational axis. The liquid transfer system may include at least one liquid transfer module operatively attached to at least one of the spokes.

A liquid transfer module may include a first tank located on the at least one of the spokes positioned radially outward with respect to the rotational axis, the first tank including a first inlet that discharges into the first tank and a first pump operatively attached to a first tank outlet. The liquid transfer module may additionally include a second tank located on the at least one of the spokes positioned radially inward with respect to the rotational axis comprising a second inlet that discharges into the second tank and a second pump operatively attached to a second tank outlet. The liquid transfer module may further include a first liquid conduit connecting the first tank outlet to the second tank inlet and permitting the liquid to flow from the first tank to the second tank via selective activation of the first pump, and a second liquid conduit connecting the second tank outlet to the first tank inlet and permitting the liquid to flow from the second tank to the first tank via selective activation of the second pump.

The liquid transfer system may rotate about the rotational axis via the spokes. Pumping the liquid from the first tank to the second tank may increase radial inward motion to decrease a dynamic moment of inertia. Pumping the liquid from the second tank to the first tank may increase radial outward motion to increase the dynamic moment of inertia.

In another aspect, the liquid transfer system may include at least two liquid transfer modules oriented to be diametrically opposed with respect to the rotational axis.

In another aspect, the at least two liquid transfer modules may contain approximately equal quantities of the liquid to balance each other about the rotational axis.

In another aspect, counterweights may be operatively attached to at least some of the spokes. The counterweights may be balanced and diametrically opposed about the rotational axis to provide a static moment of inertia.

In another aspect, four liquid transfer modules may be included.

In another aspect, the first pump may be activated by a first float switch located in the first tank, and the second pump may be activated by a second float switch located in the second tank.

In another aspect, the first pump may be activated when the liquid transfer module is rotated within a fourth angular quadrant causing the liquid in the first tank to active the first float switch. Additionally, the second pump may be activated when the liquid transfer module is rotated within a second angular quadrant causing the liquid in the second tank to activate the second float switch.

In another aspect, the first pump may be activated when the liquid transfer module is within at least part of a third angular quadrant and a fourth angular quadrant. Additionally, the second pump may be activated when the liquid transfer module is within at least part of a first angular quadrant and a second angular quadrant.

In another aspect, the shaft may be operatively connected to a mechanical output to generate electrical power. At least part of the electrical power may be used to at least partially drive the first pump and the second pump.

In another aspect, a transmission may be provided to rotate a mechanical output proportionally to the shaft as determined by a gear ratio.

In another aspect, each of the spokes may be spaced about the hub such to have substantially equal angular distance therebetween.

According to an embodiment enabled by this disclosure, a gravitational torque amplifier is provided for improving rotational efficiency, comprising a hub, spokes, and a liquid transfer system. The hub may be operatively attached to a shaft that rotates about a rotational axis. The spokes may be operatively attached to and extend outwardly from the hub, the spokes being orthogonal to rotational axis. The liquid transfer system may include at least two liquid transfer modules, each operatively attached to at least one of the spokes such to be diametrically opposed with respect to the rotational axis.

Each of the liquid transfer modules may include a first tank located on the at least one of the spokes positioned radially outward with respect to the rotational axis, the first tank comprising a first inlet that discharges into the first tank, a first pump operatively attached to a first tank outlet, and a first float switch to selectively enable the first pump. Each of the liquid transfer modules may additionally include a second tank located on the at least one of the spokes positioned radially inward with respect to the rotational axis comprising a second inlet that discharges into the second tank, a second pump operatively attached to a second tank outlet, and a second float switch to selectively enable the second pump. The liquid transfer modules may further include a first liquid conduit connecting the first tank outlet to the second tank inlet and permitting the liquid to flow from the first tank to the second tank via selective activation of the first pump, and a second liquid conduit connecting the second tank outlet to the first tank inlet and permitting the liquid to flow from the second tank to the first tank via selective activation of the second pump.

A buoyancy of the first float switch and the second float switch may be greater than a centrifugal force of the liquid transfer system. Pumping the liquid from the first tank to the second tank may increase radial inward motion to decrease a dynamic moment of inertia. Pumping the liquid from the second tank to the first tank may increase radial outward motion to increase the dynamic moment of inertia.

In another aspect, the at least two liquid transfer modules may include approximately equal quantities of the liquid to balance each other about the rotational axis.

In another aspect, counterweights may be operatively attached to at least some of the spokes, the counterweights being balanced and diametrically opposed about the rotational axis to provide a static moment of inertia.

In another aspect, at least four liquid transfer modules may be provided.

In another aspect, the first pump may be activated when the liquid transfer module is rotated within a fourth angular quadrant causing the liquid in the first tank to active the first float switch. The second pump may be activated when the liquid transfer module is rotated within a second angular quadrant causing the liquid in the second tank to activate the second float switch.

In another aspect, each of the spokes may be spaced about the hub such to have substantially equal angular distance therebetween.

According to an embodiment enabled by this disclosure, a method is provided for amplifying gravitational torque to improve rotational efficiency. The method may include (a) rotating a hub attached to a shaft about a rotational axis, the hub including spokes operatively attached to and extending outwardly from the hub, the spokes being orthogonal to rotational axis. The method may additionally include (b) orienting a liquid transfer system comprising at least two liquid transfer modules, each operatively attached to at least one of the spokes to initiate movement of a liquid between a distal location and a proximal location relative to the rotational axis.

Each of the liquid transfer modules may include a first tank located on the at least one of the spokes positioned radially outward with respect to the rotational axis, the first tank including a first inlet that discharges into the first tank, a first pump operatively attached to a first tank outlet, and a first float switch to selectively enable the first pump. Each of the liquid transfer modules may also include a second tank located on the at least one of the spokes positioned radially inward with respect to the rotational axis comprising a second inlet that discharges into the second tank, a second pump operatively attached to a second tank outlet, and a second float switch to selectively enable the second pump. Additionally, each of the liquid transfer modules may include a first liquid conduit connecting the first tank outlet to the second tank inlet and permitting the liquid to flow from the first tank to the second tank via selective activation of the first pump, and a second liquid conduit connecting the second tank outlet to the first tank inlet and permitting the liquid to flow from the second tank to the first tank via selective activation of the second pump.

The method may further include (c) selectively decreasing a dynamic moment of inertia by pumping the liquid from the first tank to the second tank to increase radial inward motion upon activation of the first float switch. The method may include (d) selectively increasing the dynamic moment of inertia by pumping the liquid from the second tank to the first tank to increase radial outward motion upon activation of the second float switch. The liquid transfer system may rotate about a direction of travel about the rotational axis. Each of the spokes may be spaced about the hub such to have substantially equal angular distance therebetween.

In another aspect of the method, at least two liquid transfer modules may be oriented to be diametrically opposed with respect to the rotational axis. The at least two liquid transfer modules may contain approximately equal quantities of the liquid to balance each other about the rotational axis.

In another aspect, the method may further include (e) rotating counterweights operatively attached to at least some of the spokes, the counterweights being balanced and diametrically opposed about the rotational axis to provide a static moment of inertia.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

The following disclosure is provided to describe various embodiments of a gravitational torque amplifier for improving rotational efficiency. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

For the purpose of clearly describing the components and features discussed throughout this disclosure, some frequently used terms will now be defined, without limitation. The term spokes, as it is used throughout this disclosure, is defined as one or more bars which may extend outwardly from a hub. The term gravitational torque, as it is used throughout this disclosure, is defined as the force of gravity exerted on an object that may have a vertical component of turning. The term liquid conduit, as it is used throughout this disclosure, is defined as a pipe, tube, or channel through which liquid is conveyed. The term counterweight, as it is used throughout this disclosure, is defined as an object used to oppose or balance with an equal weighted object, the counterweighted objects typically being diametrically opposed. The term angular quadrant, as it is used throughout this disclosure, is defined as an approximately 90-degree section on a circle.

The term moment of inertia, as it is used throughout this disclosure, is defined as a measure of an object's resistance to changes in its rotation, which may describe how difficult it is to start, stop, or change the speed of a rotating object. The term static moment of inertia, as it is used throughout this disclosure, is defined as a substantially consistent resistance to change in rotation, such as may be provided by counterweights or a flywheel. The term dynamic moment of inertia, as it is used throughout this disclosure, is defined as a variable resistance to change in rotation, such as may be affected by moving a rotating mass (such as a pumpable liquid) between proximal and distal locations with respect to a rotational axis. The term radial motion, as it is used throughout this disclosure, is defined as movement of a mass along a radius, either towards or away from a center of rotation.

Various aspects of the present disclosure will now be described in detail, without limitation. In the following disclosure, a gravitational torque amplifier for improving rotational efficiency will be discussed. Those of skill in the art will appreciate alternative labeling of the gravitational torque amplifier for improving rotational efficiency as a water tank turbine, external generator assistance machine, rotational force creator apparatus, rotational efficiency invention, the invention, the apparatus, or other similar names. Similarly, those of skill in the art will appreciate alternative labeling of the gravitational torque amplifier for improving rotational efficiency as a method for mitigating rotational losses, torque amplification method, operation, the invention, or other similar names. Skilled readers should not view the inclusion of any alternative labels as limiting in any way.

Referring now to FIGS. 1-10, the gravitational torque amplifier for improving rotational efficiency 100, 200, 300, 400, 500 will now be discussed in more detail. The gravitational torque amplifier for improving rotational efficiency 100, 200, 300, 400, 500 may include a hub 102, 302, 402, 502; spokes 104, 304, 404, 504; liquid transfer system including liquid transfer modules 106, 206, 306, 406, 506; first tank 110, 210, 310, 410, 510; second tank 130, 230, 330, 430, 530; and additional components that will be discussed in greater detail below. The gravitational torque amplifier for improving rotational efficiency may operate one or more of these components interactively with other components.

In various embodiments, the gravitational torque amplifier 100, 200, 300, 400, 500 may be used as a standalone apparatus or may be attached to other objects that may generally rotate. These objects include, but are not limited to, windmills and wind turbines. The addition of the gravitational torque amplifier 100, 200, 300, 400, 500 on these objects may assist in improving the rotational efficiency of these objects, without limitation.

The liquid 160, 460 within the liquid transfer module 106, 206, 306, 406, 506 may have various densities and fill various volumes. In embodiments, the liquid 160, 460 may be water, oil, acetone, glycerin, alcohol, mercury, and/or other liquids that would be appreciated by a person of skill in the art after having the benefit of this disclosure. Examples given throughout this disclosure that use water as the liquid 160, 460 are not intended to be limiting of any additional embodiments.

The hub will now be discussed in greater detail. FIGS. 1, 3-5 highlight examples of the hub, which may also be shown in other figures. In various embodiments, the hub 102, 302, 402, 502 may be a central figure of the apparatus. The hub 102, 302, 402, 502 may have spokes 104, 304, 404, 504 extending outwardly from the hub 102, 302, 402, 502, which will be discussed in greater detail below.

In other embodiments, the hub 102, 302, 402, 502 may be connected to a shaft 150, 450. The shaft 150, 450 may assist in the rotating of the gravitational torque amplifier 100, 200, 300, 400, 500. The shaft 150, 450 may be of virtually any length but may advantageously be provided by a length that may best be suited for rotating the liquid transfer systems. Additionally, similar to the hub 102, 302, 402, 502, the shaft 150, 450 may be made of virtually any material including, but not limited to, metal, plastic, wood, stone, rubber, or a combination thereof. Those skilled in the art will appreciate the various materials that may be used to construct the shaft 150, 450 after having the benefit of this disclosure. In one or more embodiments, the shaft 150, 450 and the hub 102, 302, 402, 502 may be formed as one piece, while in other embodiments, the shaft 150, 450 and the hub 102, 302, 402, 502 may be formed as two separate pieces that are connected together. In the same or different embodiments, the shaft 150, 450 may also be connected to a transmission. Those skilled in the art, however, will appreciate the various connections that may be made with the shaft 150, 450, after having the benefit of this disclosure.

In embodiments, the hub 102, 302, 402, 502 may be rotationally connected to a mechanical output via a shaft 150, 450. In different embodiments, the hub 102, 302, 402, 502 may be directly connected to a mechanical output without a shaft 150, 450 in the middle. Those skilled in the art will appreciate the different advantages to when a shaft 150, 450 may or may not be used, after having the benefit of this disclosure. A rotational force of the mechanical output may operatively drive an external electrical generator, in various embodiments.

The mechanical output may be operatively connected to various external devices, for example, a system of generating electrical power from the rotation of the gravitational torque amplifier 100, 200, 300, 400, 500. The electrical power that may be generated may then be used for a variety of purposes, without limitation, which may include at least partially driving the first pump 112, 212, 412 of one or more liquid transfer modules 106, 206, 306, 406, 506, driving the second pump 132, 232, 432 of one or more liquid transfer modules 106, 206, 306, 406, 506, and/or partially assisting in the rotating of the gravitational torque multiplier. However, those skilled in the art, will appreciate the various other benefits of using the generated electrical power.

Additionally, in the same or different embodiments, the gear ratio of the mechanical output may be the same or different to the turning velocity of the central hub 102, 302, 402, 502. Those skilled in the art will appreciate the various gear ratios of the mechanical output and the various turning velocities of the central hub 102, 302, 402, 502 that may be used after having the benefit of this disclosure.

The spokes will now be discussed in greater detail. FIGS. 1 and 3-5 highlight examples of the spokes, which may also be shown in other figures. As previously discussed, the spokes 104, 304, 404, 504 may extend outwardly from the hub 102, 302, 402, 502 in various embodiments. In the same or other embodiments, the hub 102, 302, 402, 502 may be distal to the liquid transfer module 106, 206, 306, 406, 506 located on the spoke. In embodiments, the number of spokes 104, 304, 404, 504 may equal the number of liquid transfer systems in the gravitational torque multiplier, without limitation.

In embodiments, the spokes 104, 304, 404, 504 may be made of virtually any material including, but not limited to, metal, plastic, wood, concrete, rubber, or a combination thereof. Those skilled in the art will appreciate the various materials that may be used to construct the spokes 104, 304, 404, 504 after having the benefit of this disclosure.

The hub 102, 302, 402, 502 and the spokes 104, 304, 404, 504 may be constructed as one monolithic element in some embodiments. In other embodiments, the hub 102, 302, 402, 502 and the spokes 104, 304, 404, 504 may be constructed as separate elements that may be connected together. Those skilled in the art will appreciate the various ways the spokes 104, 304, 404, 504 and the hub 102, 302, 402, 502 may be connected, without limitation.

The liquid transfer system will now be discussed in greater detail. FIGS. 1-5 highlight examples of the liquid transfer system, which may also be shown in other figures. As previously discussed, in various embodiments, the liquid transfer module 106, 206, 306, 406, 506 may be located on at least one of the spokes 104, 304, 404, 504 at a location distal to the central hub 102, 302, 402, 502. In some embodiments, the liquid transfer system may include one or more liquid transfer modules 106, 206, 306, 406, 506 and at least one counterweight 408, 508 to ensure the center of mass stays in or around the hub 102, 302, 402, 502 of the gravitational torque multiplier, without limitation. For example, the liquid transfer system may include two liquid transfer modules 106, 206, 306, 406, 506 and two counterweights 408, 508 provide both static and dynamic moments of inertia, advantageously providing a substantially balanced center of mass about the rotational axis 164, 464 via connection to the hub 102, 302, 402, 502, without limitation.

In one example, the liquid transfer system may include two liquid transfer modules 106, 206, 306, 406, 506 positioned opposite each other and two counterweights 408, 508 positioned opposite each other to provide both static and dynamic moments of inertia, advantageously providing a substantially balanced center of mass about the rotational axis 164, 464 via connection to the hub 102, 302, 402, 502, without limitation. In another example, the liquid transfer system may include two liquid transfer modules 106, 206, 306, 406, 506 and two counterweights 408, 508. In this example, each of the liquid transfer modules 106, 206, 306, 406, 506 may be positioned opposite to a counterweight 408, 508 to provide both static and dynamic moments of inertia, advantageously providing a substantially balanced center of mass about the rotational axis 164, 464 via connection to the hub 102, 302, 402, 502, without limitation.

Those skilled in the art will appreciate the various configurations of the liquid transfer modules 106, 206, 306, 406, 506; counterweight 408, 508; and spokes 104, 304, 404, 504 that may be included by a gravitational torque multiplier enabled by this disclosure. In the same or different embodiments, there may be a variety of counterweights 408, 508 and/or liquid transfer modules 106, 206, 306, 406, 506 attached to the hub 102, 302, 402, 502, without limitation. Some orientations include the following: two liquid transfer modules, three liquid transfer modules, four liquid transfer modules, five liquid transfer modules, six liquid transfer modules, two counterweights, three counterweights, four counterweights, five counterweights, six counterweights, one liquid transfer module and one counterweight, two liquid transfer modules and one counterweight, three liquid transfer modules and one counterweight, four liquid transfer modules and one counterweight, five liquid transfer modules and one counterweight, one liquid transfer module and two counterweights, one liquid transfer module and three counterweights, one liquid transfer module and four counterweights, one liquid transfer module and five counterweights, and one liquid transfer module and six counterweights, without limitation. Those skilled in the art will appreciate various other combinations of liquid transfer modules and counterweights that may be included by a gravitation torque multiplier that may be used after having the benefit of this disclosure.

Each liquid transfer module 106, 206, 306, 406, 506 may include a first tank 110, 210, 310, 410, 510 and a second tank 130, 230, 330, 430, 530, which will both be described in greater detail below, without limitation. Components included by the first tank 110, 210, 310, 410, 510 may evacuate liquid from the first tank 110, 210, 310, 410, 510 to the second tank. Similarly, components of the second tank 130, 230, 330, 430, 530 may evacuate liquid from the second tank to the first tank 110, 210, 310, 410, 510, without limitation. Those skilled in the art will appreciate the various number of liquid tanks may exist within the liquid transfer module 106, 206, 306, 406, 506 after having the benefit of this disclosure. Additionally, those skilled in the art will appreciate the direction of the liquid flow between the liquid tanks may be oriented such to affect a dynamic moment of inertia as the liquid is moved among the various tanks included by a liquid transfer module 106, 206, 306, 406, 506 after having the benefit of this disclosure.

In some embodiments, a first liquid conduit 120, 220, 320, 420, 520 may connect the first tank to the second tank. More specifically, the first liquid conduit 120, 220, 320, 420, 520 may connect the first tank outlet 116, 416 of the first tank to the second tank inlet 138, 438 of the second tank, without limitation. For example, as at least part of the liquid 160, 460 is pumped from the first tank 110, 210, 310, 410, 510 to the second tank 130, 230, 330, 430, 530, the liquid may travel from the first pump 112, 212, 412 of the first tank to be deposited into the second tank via the first liquid conduit 120, 220, 320, 420, 520. Those skilled in the art will appreciate various additional connections with regard to the first liquid conduit 120, 220, 320, 420, 520 after having the benefit of this disclosure.

In the same or other embodiments, a second liquid conduit 140, 240, 340, 440, 540 may connect the second tank to the first tank. More specifically, the second liquid conduit 140, 240, 340, 440, 540 may connect the second tank outlet 136, 436 of the second tank to the first tank inlet 118, 418 of the first tank, without limitation. For example, as at least part of the liquid 160, 460 is pumped form the second tank 130, 230, 330, 430, 530 to the first tank 110, 210, 310, 410, 510, the liquid may travel from the second pump 132, 232, 432 of the second tank to be deposited into the first tank via the second liquid conduit 140, 240, 340, 440, 540. Those skilled in the art will appreciate various additional connections with regard to the second liquid conduit 140, 240, 340, 440, 540 after having the benefit of this disclosure.

In various embodiments, the second tank 130, 230, 330, 430, 530 of the liquid transfer module 106, 206, 306, 406, 506 may be positioned on the spoke between the first tank and the hub 102, 302, 402, 502. The first and second tanks may be oriented such that as the liquid 160, 460 is moved between the first tank 110, 210, 310, 410, 510 and second tank 130, 230, 330, 430, 530, mass may be moved between a distal and proximal position with respect to the rotational axis 164, 464, thereby affecting the dynamic moment of inertia. Those skilled in the art, however, will appreciate various additional relative positions of the first tank and the second tank to the hub 102, 302, 402, 502, after having the benefit of this disclosure.

Generally, each liquid transfer module 106, 206, 306, 406, 506 may rotate along a direction of travel 362, 562 about the rotational axis 164, 464 of the hub 102, 302, 402, 502. Those skilled in the art will appreciate various additional directions of travel, speed, and acceleration that may be used with a gravitational torque amplifier after having the benefit of this disclosure.

The first tank will now be discussed in greater detail. FIGS. 1-5 highlight examples of the first tank, which may also be shown in other figures. As previously discussed, the first tank 110, 210, 310, 410, 510 may be included by a liquid transfer module 106, 206, 306, 406, 506. The first tank 110, 210, 310, 410, 510 may comprise a first pump 112, 212, 412, a first tank inlet 118, 418, and a first tank outlet 116, 416, without limitation. In the same or different embodiments, the first tank 110, 210, 310, 410, 510 may further comprise a first filling end 224 distal to a first evacuation end 222. The first tank inlet 118, 418 may be located at the first filling end 224, while the first tank outlet 116, 416 may be located at the first evacuation end 222. Those skilled in the art will appreciate the various features that the first tank 110, 210, 310, 410, 510 may have, after having the benefit of this disclosure.

In some embodiments, the first pump 112, 212, 412 may be located in the first tank 110, 210, 310, 410, 510 and/or around the first tank outlet 116, 416. The first pump 112, 212, 412 may be a sump pump, reciprocating pump, rotary pump, diaphragm pump, centrifugal pump, axial flow pump, and/or a vacuum pump, without limitation. Those skilled in the art will appreciate various additional pump types that may be used within the first tank 110, 210, 310, 410, 510, after having the benefit of this disclosure.

In various embodiments, the purpose of the first pump 112, 212, 412 may be to move water from the first tank 110, 210, 310, 410, 510 to the second tank 130, 230, 330, 430, 530 via the first liquid conduit 120, 220, 320, 420, 520. Further reasoning for the movement of liquid 160, 460 will be discussed in greater detail below.

In the same or different embodiments, the first pump 112, 212, 412 may be activated and/or deactivated by a first float switch 114, 414 located in the first tank 110, 210, 310, 410, 510. The buoyancy of the first float switch 114, 414 may also be greater than the centrifugal force of the liquid transfer module 106, 206, 306, 406, 506 when the gravitational torque amplifier 100, 200, 300, 400, 500 is in use. Other switches that may be used to activate and/or deactivate the first pump 112, 212, 412 include, but are not limited to, limit switches, proximity switches, optical switches, pressure switches, and/or flow switches.

The second tank will now be discussed in greater detail. FIGS. 1-5 highlight examples of the second tank, which may also be shown in other figures. As previously discussed, the second tank 130, 230, 330, 430, 530 may be included by a liquid transfer module 106, 206, 306, 406, 506. The second tank may comprise a second pump 132, 232, 432, a second tank inlet 138, 438, and a second tank outlet 136, 436, without limitation. In the same or different embodiments, the second tank may further comprise a second filling end 228 distal to a second evacuation end 226. The second tank inlet 138, 438 may be located at the second filling end 228, while the second tank outlet 136, 436 may be located at the second evacuation end 226. Those skilled in the art will appreciate the various features that the second tank 130, 230, 330, 430, 530 may have, after having the benefit of this disclosure.

In some embodiments, the second pump 132, 232, 432 may be located in and/or around the second tank 130, 230, 330, 430, 530 and/or the second tank outlet 136, 436. The second pump 132, 232, 432 may be a sump pump, reciprocating pump, rotary pump, diaphragm pump, centrifugal pump, axial flow pump, and/or a vacuum pump, without limitation. Those skilled in the art will appreciate various additional pump types that may be used within the second tank 130, 230, 330, 430, 530, after having the benefit of this disclosure.

In various embodiments, the purpose of the second pump 132, 232, 432 may be to move water from the second tank 130, 230, 330, 430, 530 to the first tank 110, 210, 310, 410, 510 via the second liquid conduit 140, 240, 340, 440, 540.

Further reasoning for the movement of liquid 160, 460 will be discussed in greater detail below.

In the same or different embodiments, the second pump 132, 232, 432 may be activated and/or deactivated by a second float switch 134, 434 located in the second tank 130, 230, 330, 430, 530. The buoyancy of the second float switch 134, 434 may also be greater than the centrifugal force of the liquid transfer module 106, 206, 306, 406, 506 when the gravitational torque amplifier 100, 200, 300, 400, 500 is in use. Other switches that may be used to activate and/or deactivate the first pump 112, 212, 412 include, but are not limited to, limit switches, proximity switches, optical switches, pressure switches, and/or flow switches.

In various embodiments, the gravitational torque amplifier 100, 200, 300, 400, 500 is generally used to improve rotational efficiency. This may be done by using one or more liquid transfer module 106, 206, 306, 406, 506. For example, when the first tank 110, 210, 310, 410, 510 of the liquid transfer module 106, 206, 306, 406, 506 is in a fourth quadrant 758 of rotation, the first pump 112, 212, 412 may be activated to evacuate water into the second tank 130, 230, 330, 430, 530; which may decrease the dynamic moment of inertia of the liquid transfer module 106, 206, 306, 406, 506 by moving the liquid radially inward towards the hub 102, 302, 402, 502 and thus rotational axis 164, 464.

In the same or different embodiments, the opposite may also happen. When the second tank 130, 230, 330, 430, 530 of the liquid transfer module 106, 206, 306, 406, 506 is in a second quadrant 754 of rotation, the second pump 132, 232, 432 may be activated to evacuate water into the first tank 110, 210, 310, 410, 510; which may advantageously increase the dynamic moment of inertia of the liquid transfer module 106, 206, 306, 406, 506 by moving the liquid radially outward from the hub 102, 302, 402, 502 and thus the rotational axis 164, 464. Those skilled in the art will appreciate the various locations that each pump may activate to improve the rotational efficiency of the gravitational torque amplifier, after having the benefit of this disclosure.

Figure 1:
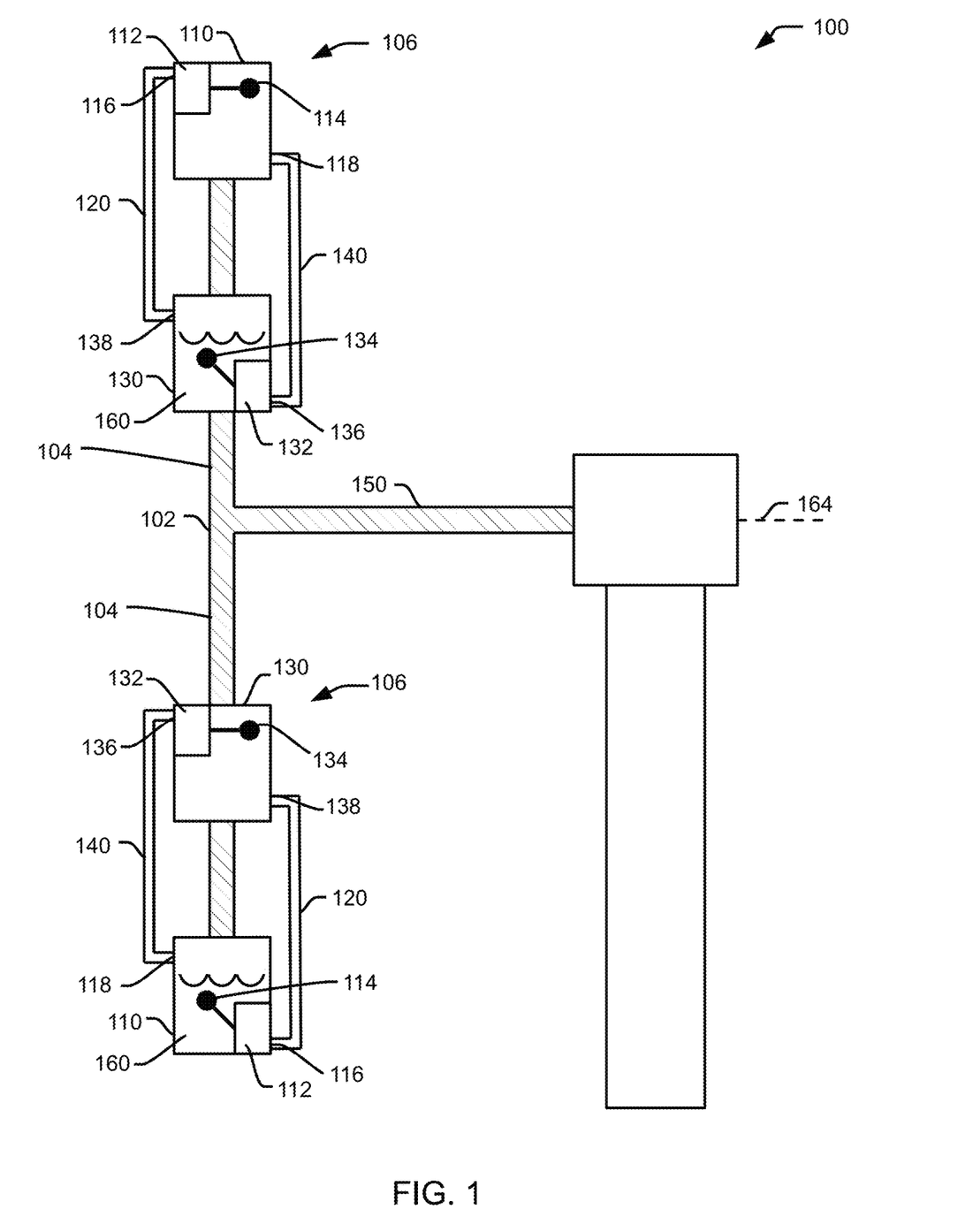
FIG. 1 is a side elevation view of a gravitational torque amplifier for improving rotational efficiency, according to an embodiment of this disclosure.
Figure 2:
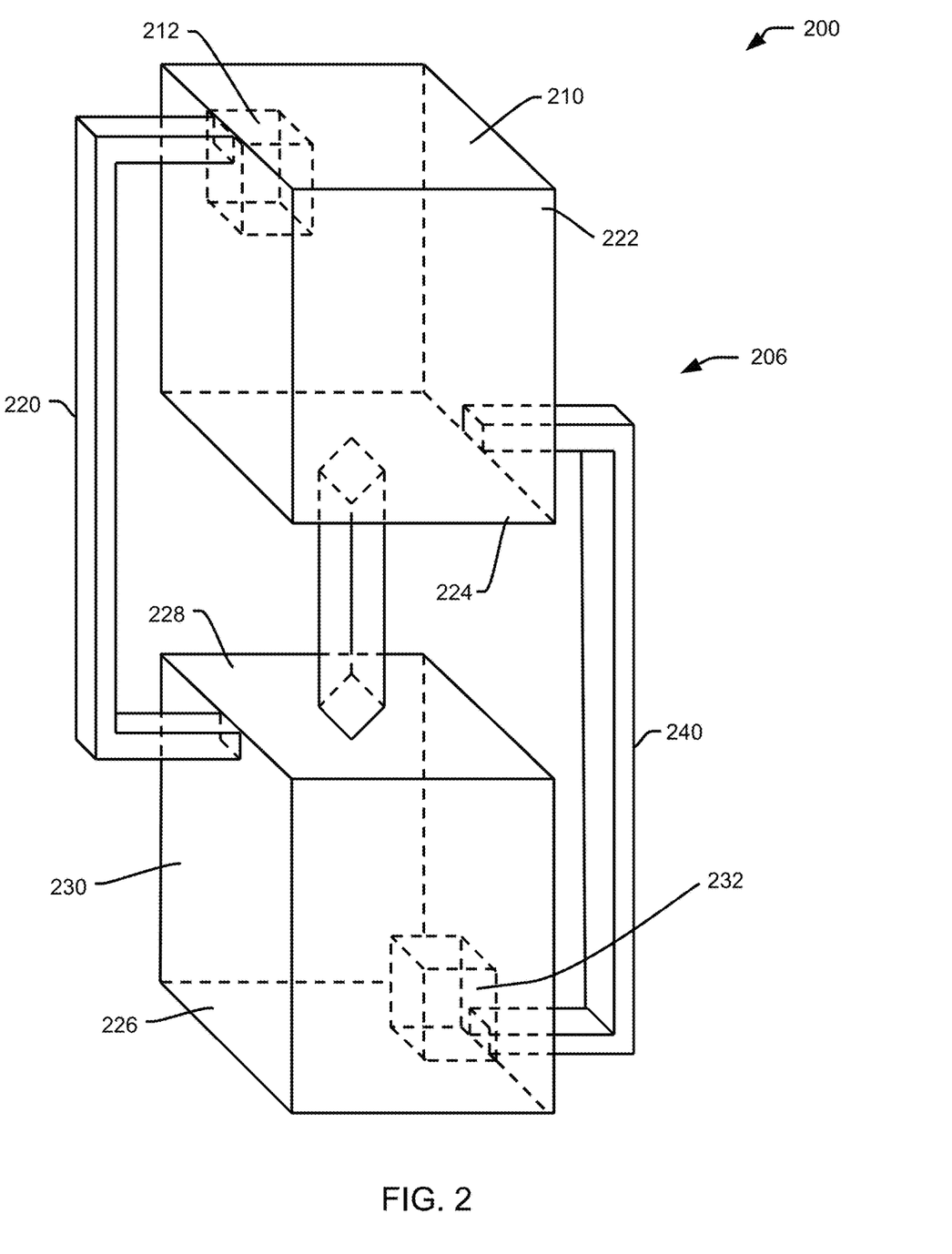
FIG. 2 is a perspective view of a liquid transfer module, according to an embodiment of this disclosure.
Figure 3:
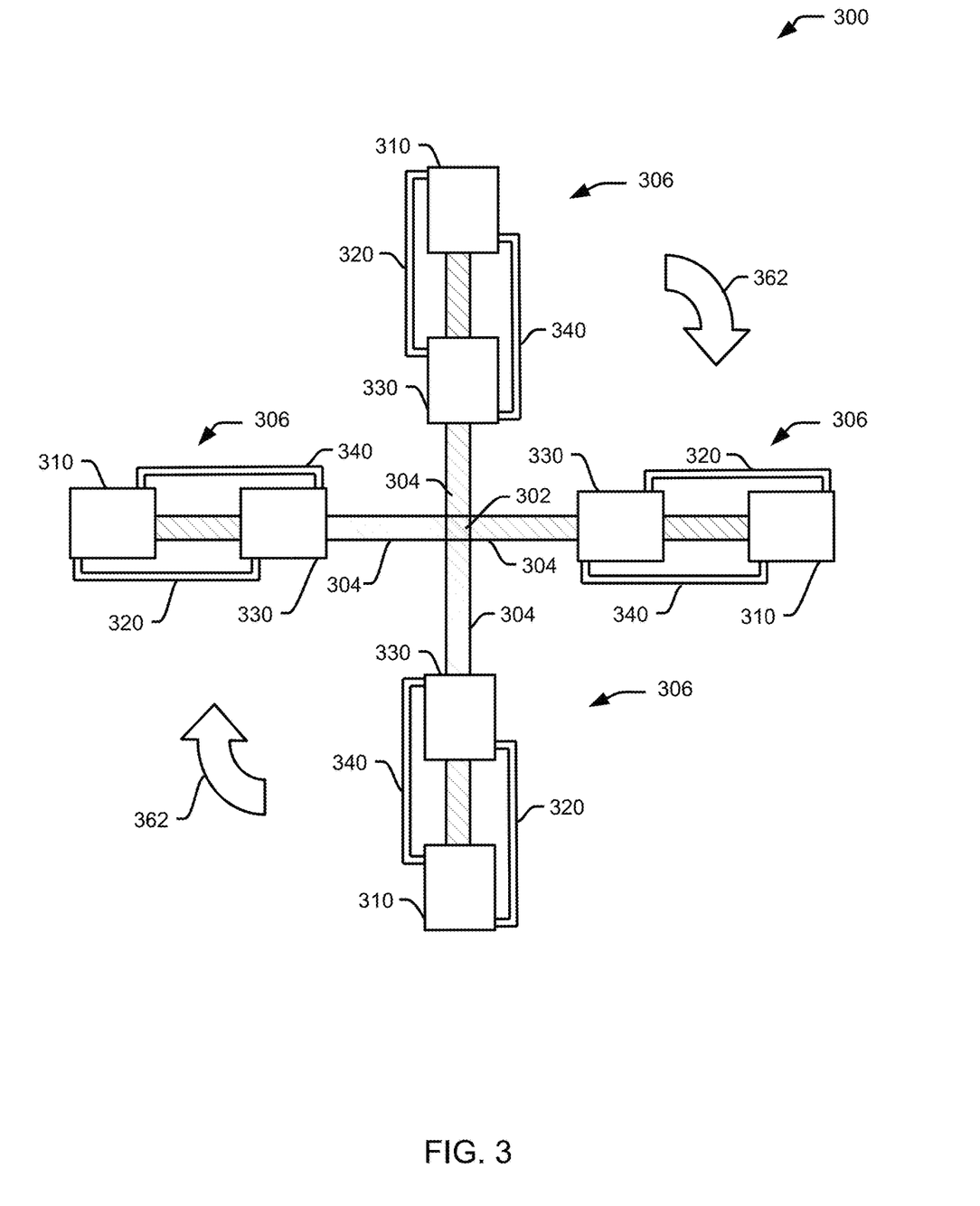
FIG. 3 is a front elevation view of a gravitational torque amplifier for improving rotational efficiency using four liquid transfer modules, according to an embodiment of this disclosure.
Figure 4:
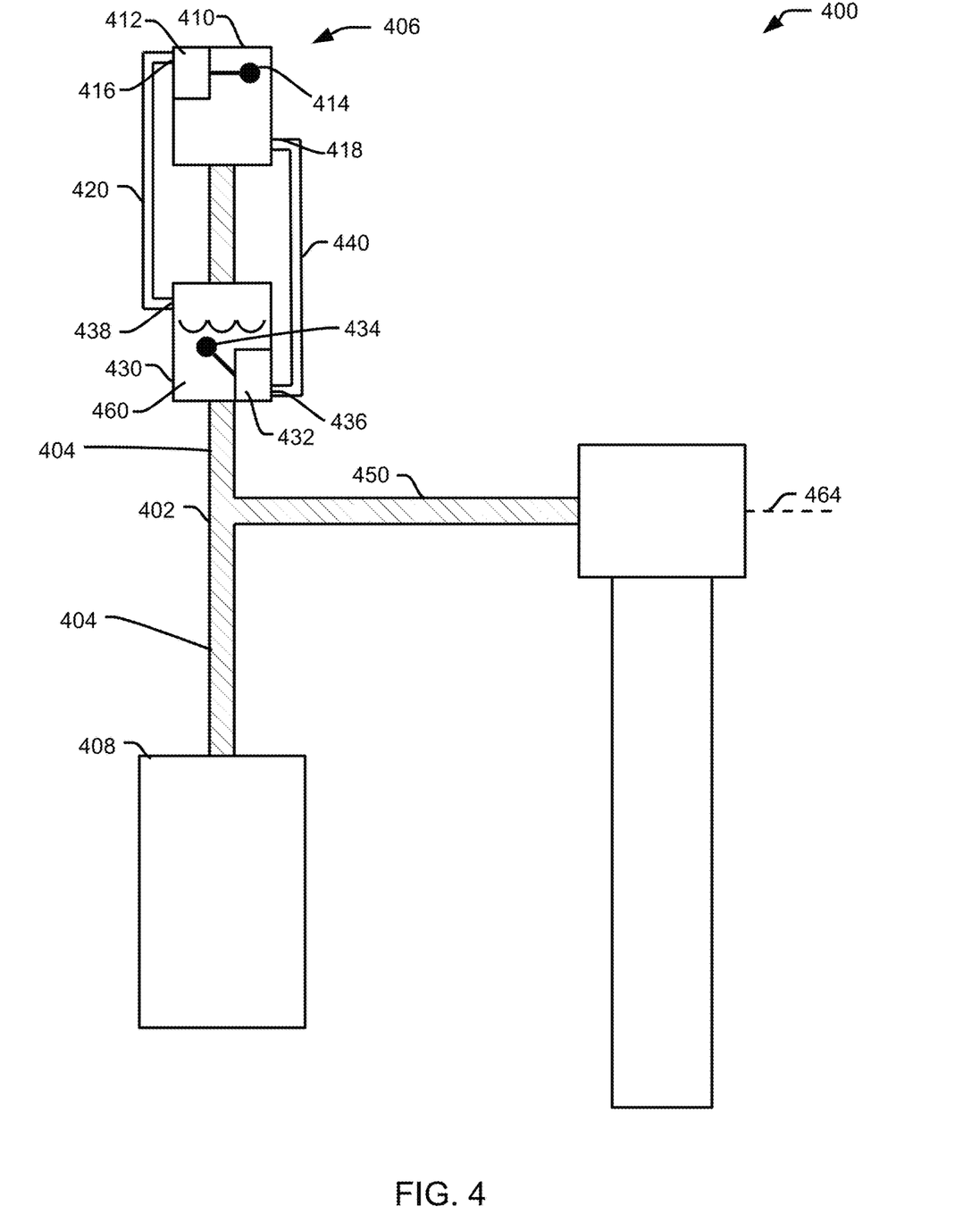
FIG. 4 is a side elevation view of a gravitational torque amplifier for improving rotational efficiency, according to an alternative embodiment of this disclosure.
Figure 5:
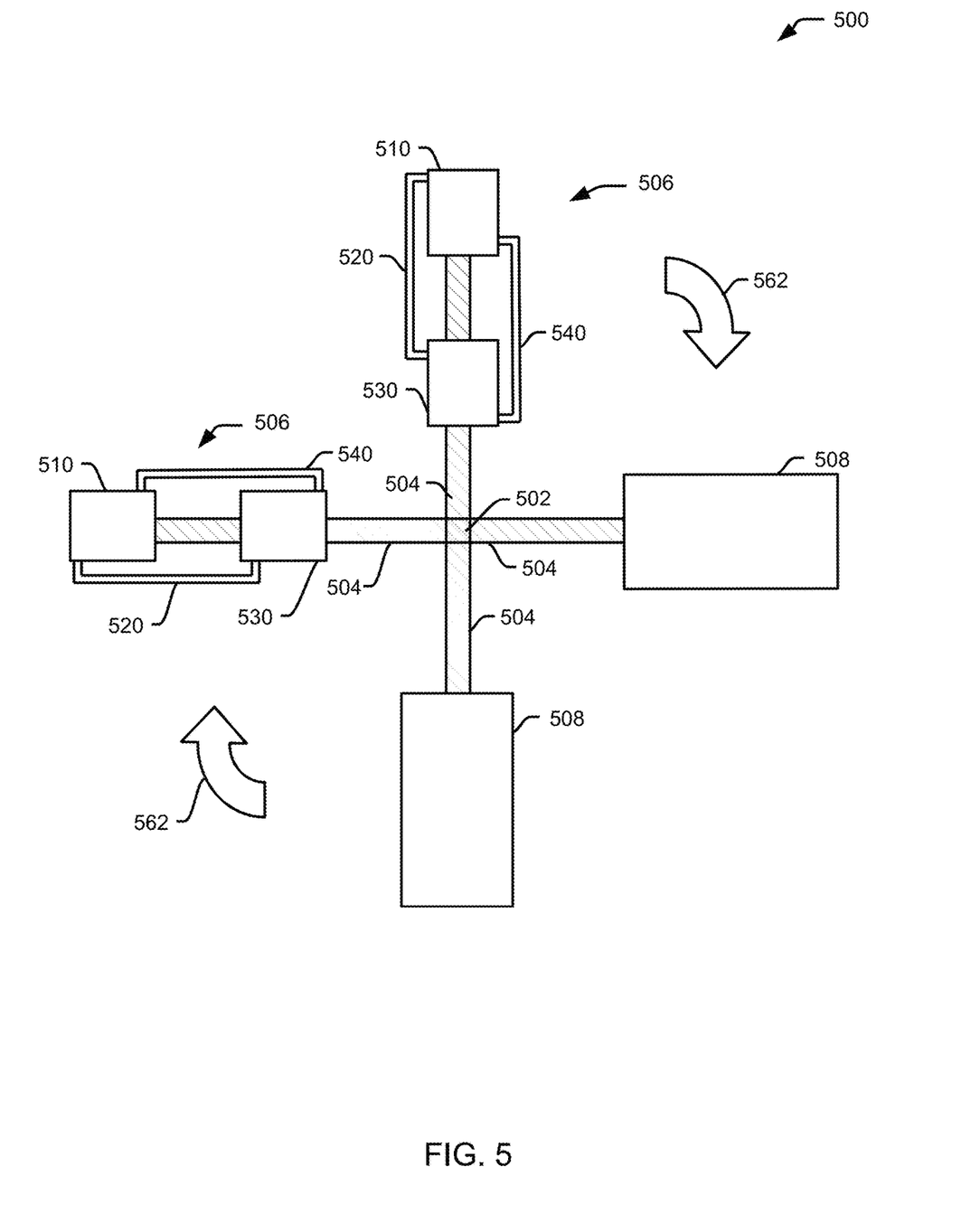
FIG. 5 is a front elevation view of a gravitational torque amplifier for improving rotational efficiency using two liquid transfer modules and two counterweights, according to an alternative embodiment of this disclosure.
Figure 6:
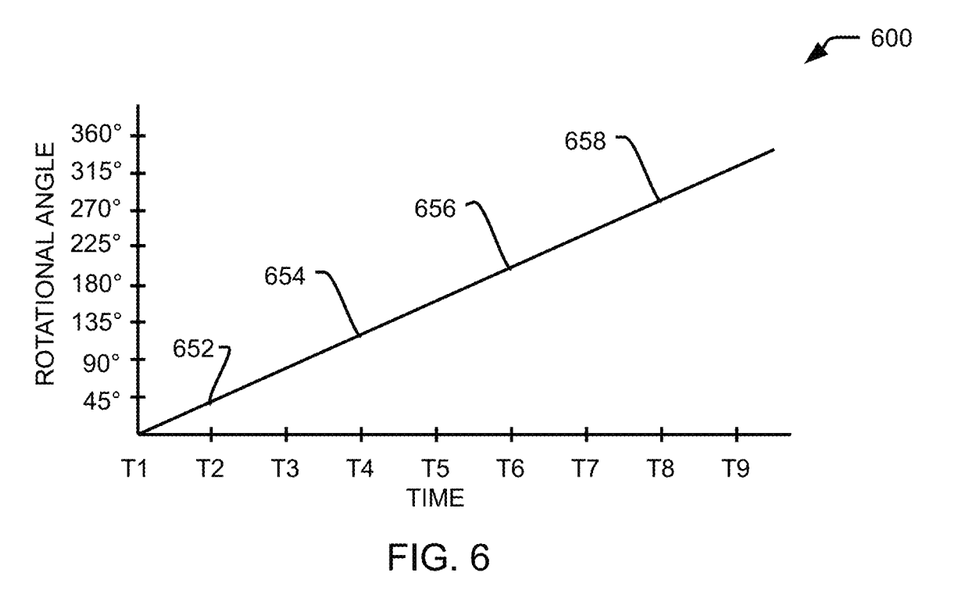
FIG. 6 is a graph view of a liquid transfer system rotational angle position relative to time, according to an embodiment of this disclosure.

Referring now to graph 600 of FIG. 6, a liquid transfer system rotational angle position versus time graph is presented. The approximately continuous increasing line shows the angular position of the liquid transfer module at a specified time. For example, looking at event 652, the liquid transfer system is at an angle of 45 degrees at time T2. In this example, a hub, spoke, and attached liquid transfer modules may continue to rotate about the axis of rotation. As the rotation continues to event 654, the liquid transfer module is at an angle of 135 degrees at time T4. In this example, the liquid transfer module may be within the second quadrant and the liquid may be pumped from the second tank to the first tank of that liquid transfer module. As the rotation continues to event 656, the liquid transfer system is at an angle of 225 at time T6 and may continue to rotate. As rotation continues to at event 658, the liquid transfer module is at an angle of 315 at time T8. In this example, the liquid transfer module may be within the fourth quadrant and the liquid may be pumped from the first tank to the second tank of that liquid transfer module.

Figure 7:
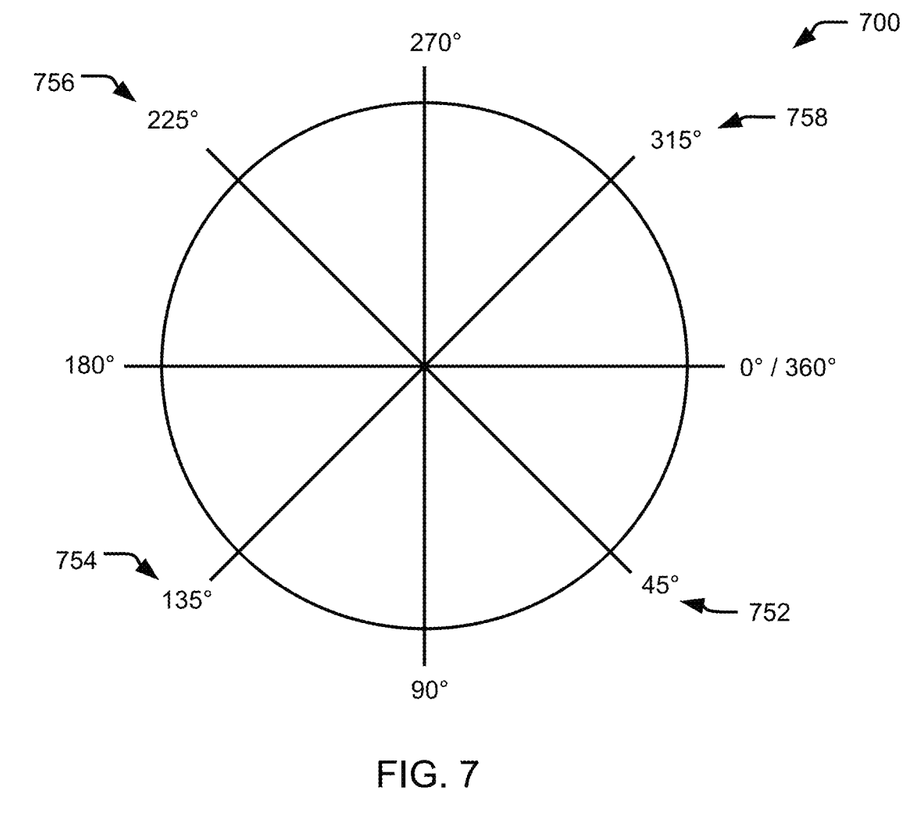
FIG. 7 is a graph view of a liquid transfer system rotational angle position relative to angle markings, according to an embodiment of this disclosure.

Referring now to graph 700 of FIG. 7, the angular positions that were described above are shown. Once again, mark 752 shows an angular position of 45 degrees, which may be included within a first quadrant. Mark 754 shows an angular position of 135 degrees, which may be included within a second quadrant. Mark 756 shows an angular position of 225 degrees, which may be included within a third quadrant. Finally, mark 758 shows an angular position of 315 degrees, which may be included within a fourth quadrant.

Figure 8:
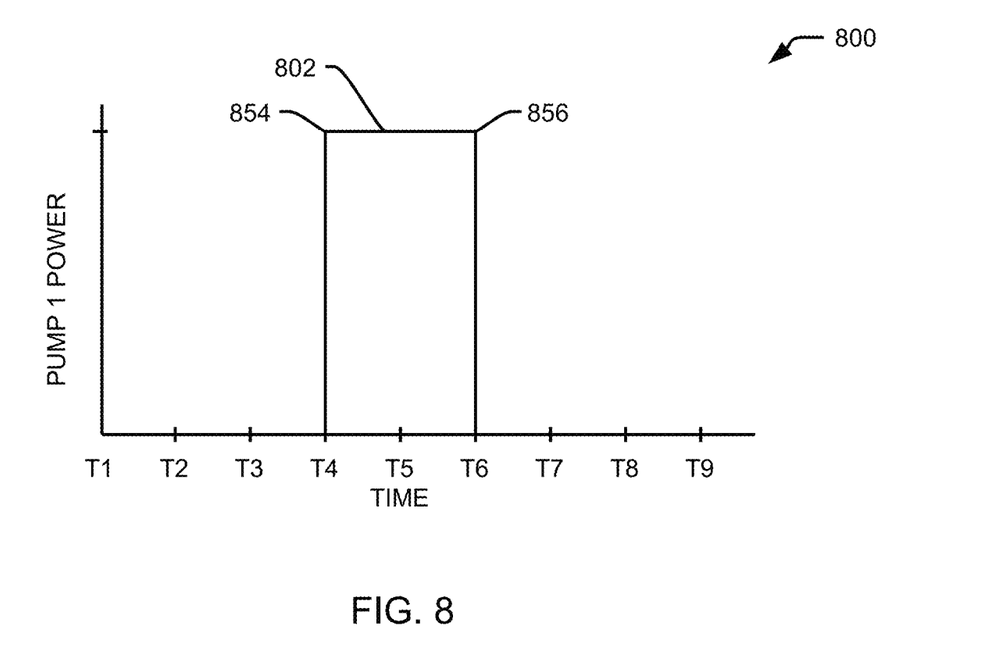
FIG. 8 is a graph view of an illustrative operation of a first pump of a liquid transfer module, according to an embodiment of this disclosure.

Referring now to graph 800 of FIG. 8, an example operation of a first pump versus time will now be discussed, without limitation. In this example, between T1 and T4, the first pump may be disabled. At T4, the first pump may be enabled to a pumping state 802 as of event 854. The first pump may continue operation in the pumping state 802 until T6, at which the first pump may be disabled as of event 856. The pump may remain disabled until rotation again reaches event 854.

Figure 9:
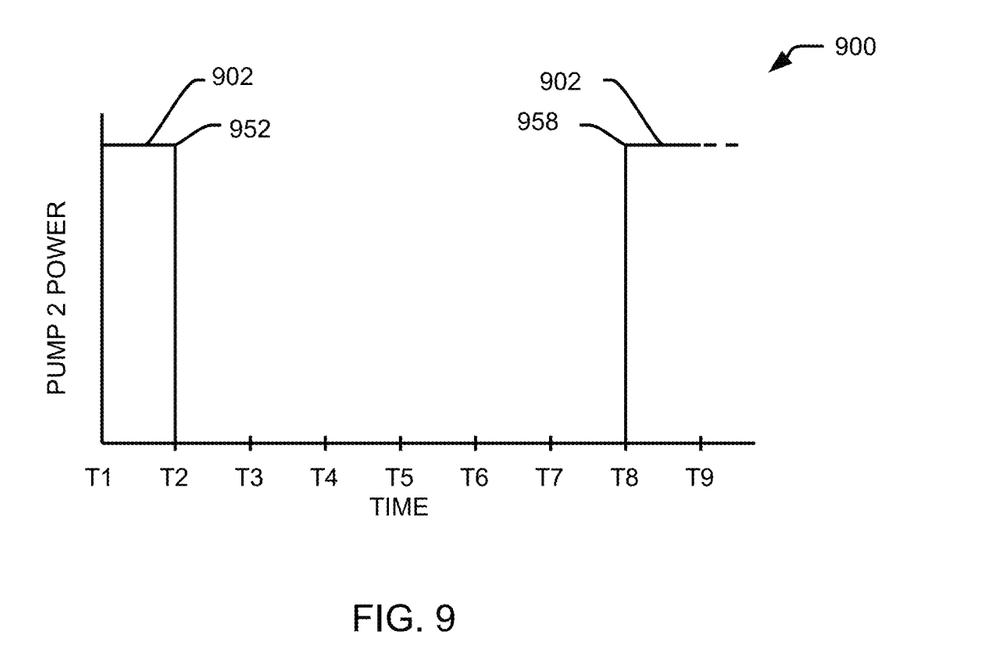
FIG. 9 is a graph view of an illustrative operation of a second pump of a liquid transfer module, according to an embodiment of this disclosure.

Referring now to graph 900 of FIG. 9, an example operation of a second pump versus time will now be discussed, without limitation. In this example, the second pump may be operating in a pumping state 902 between T1 and T2. Upon event 952 at T2, the second pump may be disabled. The second pump may remain disabled until event 958, at which the second pump may again be enabled to a pumping state 902. The second pump may remain enabled through T9, which may loop again to maintain the pumping state 902 until T2 is reached.

Figure 10:
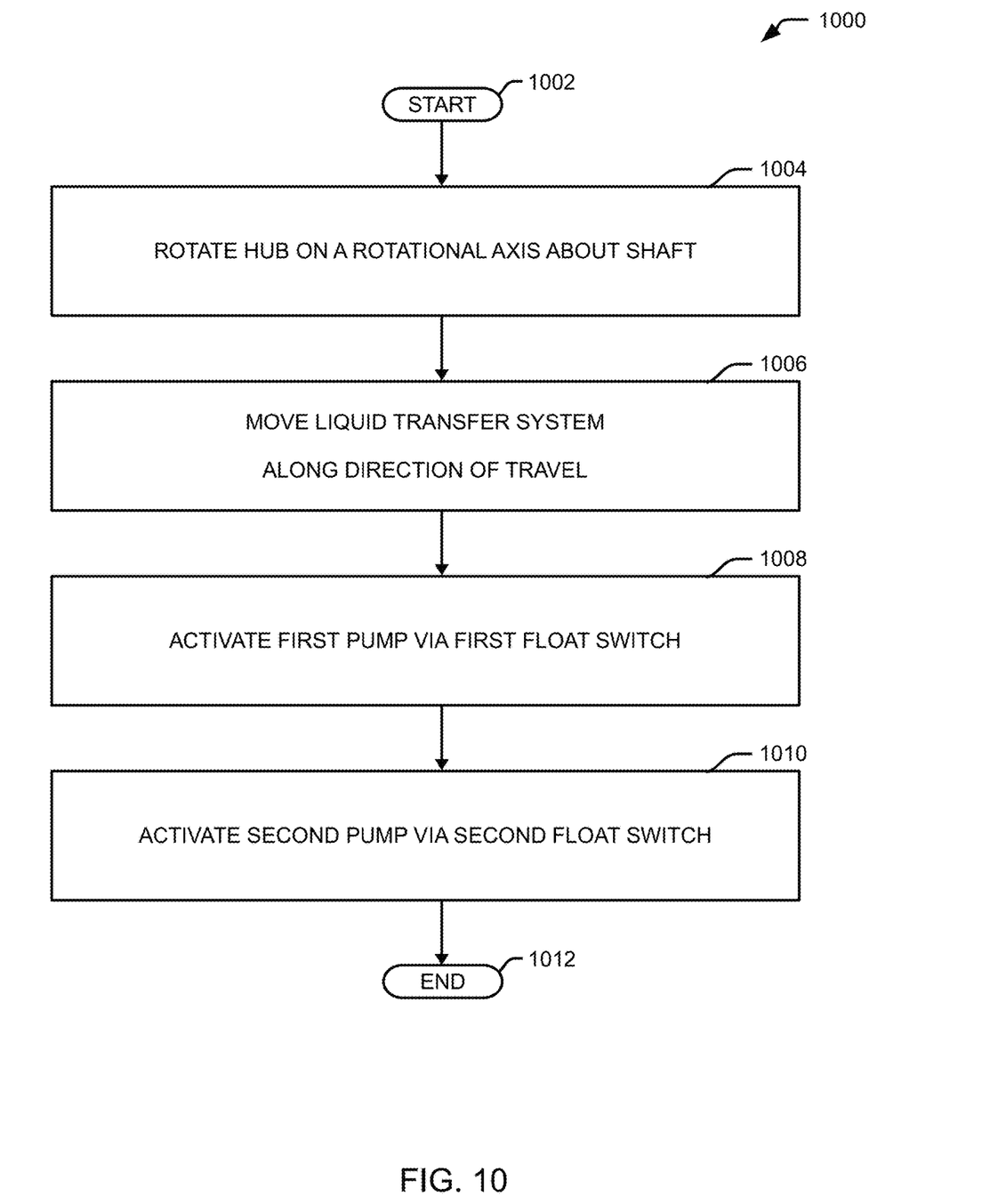
FIG. 10 is a flow chart view of an example method for using a gravitational torque amplifier for improving rotational efficiency, according to an embodiment of this disclosure.

Referring now to flowchart 1000 of FIG. 10, an illustrative method for using the gravitational torque amplifier to improve rotational efficiency will be described, without limitation. Starting with Block 1002, the operation may begin by rotating a hub and connected spokes about a rotational axis about a shaft (Block 1004). As the hub and spokes rotate, each liquid transfer module attached to the spokes may be additionally rotated along a direction of travel (Block 1006). A first float switch controlling the first pump may be activated by liquid held in the first tank, engaging the first pump to evacuate the liquid from the first tank radially inward to the second tank (Block 1008). As the mass is moved radially inward, the dynamic moment of inertia may be reduced. The pumping operation by the first pump may continue until the float switch is no longer activated and/or the pumping operation is timed out.

As rotation continues, a second float switch controlling the second pump may be activated by liquid held in the second tank, engaging the second pump to evacuate the liquid from the second tank radially outward to the first tank (Block 1010). As the mass is moved radially outward, the dynamic moment of inertia may be increased. The pumping operation by the second pump may continue until the float switch is no longer activated and/or the pumping operation is timed out. The operation may terminate at Block 1012.

Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A gravitational torque amplifier for improving rotational efficiency, comprising:
   a hub operatively attached to a shaft that rotates about a rotational axis;
   spokes operatively attached to and extending outwardly from the hub, the spokes being orthogonal to the rotational axis;
   a liquid transfer system comprising at least one liquid transfer module operatively attached to at least one of the spokes comprising:
      a first tank located on the at least one of the spokes positioned radially outward with respect to the rotational axis, the first tank comprising a first tank inlet that discharges into the first tank and a first pump operatively attached to a first tank outlet,
      a second tank located on the at least one of the spokes positioned radially inward with respect to the rotational axis comprising a second tank inlet that discharges into the second tank and a second pump operatively attached to a second tank outlet,
      a first liquid conduit connecting the first tank outlet to the second tank inlet and permitting a liquid to flow from the first tank to the second tank via selective activation of the first pump, and
      a second liquid conduit connecting the second tank outlet to the first tank inlet and permitting the liquid to flow from the second tank to the first tank via selective activation of the second pump;
   wherein the liquid transfer system rotates about the rotational axis via the spokes;
   wherein pumping the liquid from the first tank to the second tank increases radial inward motion to decrease a dynamic moment of inertia; and
   wherein pumping the liquid from the second tank to the first tank increases radial outward motion to increase the dynamic moment of inertia.

2. The gravitational torque amplifier of claim 1, wherein the at least one liquid transfer module is comprised of at least two liquid transfer modules oriented to be diametrically opposed with respect to the rotational axis.

3. The gravitational torque amplifier of claim 2, wherein the at least two liquid transfer modules contain approximately equal quantities of the liquid to balance each other about the rotational axis.

4. The gravitational torque amplifier of claim 1, further comprising counterweights operatively attached to at least some of the spokes, the counterweights being balanced and diametrically opposed about the rotational axis to provide a static moment of inertia.

5. The gravitational torque amplifier of claim 1, wherein the at least one liquid transfer module is comprised of four liquid transfer modules.

6. The gravitational torque amplifier of claim 1, wherein the first pump is activated by a first float switch located in the first tank; and
   wherein the second pump is activated by a second float switch located in the second tank.

7. The gravitational torque amplifier of claim 6, wherein the first pump is activated when the at least one liquid transfer module is rotated within a fourth angular quadrant causing the liquid in the first tank to active the first float switch; and
   wherein the second pump is activated when the at least one liquid transfer module is rotated within a second angular quadrant causing the liquid in the second tank to activate the second float switch.

8. The gravitational torque amplifier of claim 1, wherein the first pump is activated when the at least one liquid transfer module is within at least part of a third angular quadrant and a fourth angular quadrant; and
   wherein the second pump is activated when the at least one liquid transfer module is within at least part of a first angular quadrant and a second angular quadrant.

9. The gravitational torque amplifier of claim 1, wherein each of the spokes are spaced about the hub such to have substantially equal angular distance therebetween.

10. A gravitational torque amplifier for improving rotational efficiency, comprising:
    a hub operatively attached to a shaft that rotates about a rotational axis;
    spokes operatively attached to and extending outwardly from the hub, the spokes being orthogonal to the rotational axis;
    a liquid transfer system comprising at least two liquid transfer modules, each operatively attached to at least one of the spokes such to be diametrically opposed with respect to the rotational axis, each of the liquid transfer modules comprising:
       a first tank located on the at least one of the spokes positioned radially outward with respect to the rotational axis, the first tank comprising a first tank inlet that discharges into the first tank, a first pump operatively attached to a first tank outlet, and a first float switch to selectively enable the first pump,
       a second tank located on the at least one of the spokes positioned radially inward with respect to the rotational axis comprising a second tank inlet that discharges into the second tank, a second pump operatively attached to a second tank outlet, and a second float switch to selectively enable the second pump,
       a first liquid conduit connecting the first tank outlet to the second tank inlet and permitting a liquid to flow from the first tank to the second tank via selective activation of the first pump, and
       a second liquid conduit connecting the second tank outlet to the first tank inlet and permitting the liquid to flow from the second tank to the first tank via selective activation of the second pump;
    wherein a buoyancy of the first float switch and the second float switch is greater than a centrifugal force of the liquid transfer system;
    wherein pumping the liquid from the first tank to the second tank increases radial inward motion to decrease a dynamic moment of inertia; and
    wherein pumping the liquid from the second tank to the first tank increases radial outward motion to increase the dynamic moment of inertia.

11. The gravitational torque amplifier of claim 10, wherein the at least two liquid transfer modules contain approximately equal quantities of the liquid to balance each other about the rotational axis.

12. The gravitational torque amplifier of claim 10, further comprising counterweights operatively attached to at least some of the spokes, the counterweights being balanced and diametrically opposed about the rotational axis to provide a static moment of inertia.

13. The gravitational torque amplifier of claim 10, wherein the at least two liquid transfer modules is comprised of at least four liquid transfer modules.

14. The gravitational torque amplifier of claim 10, wherein each of the spokes are spaced about the hub such to have substantially equal angular distance therebetween.

15. A method of amplifying gravitational torque to improve rotational efficiency, comprising:
- (a) rotating a hub attached to a shaft about a rotational axis, the hub comprising spokes operatively attached to and extending outwardly from the hub, the spokes being orthogonal to the rotational axis;
- (b) orienting a liquid transfer system comprising at least two liquid transfer modules, each operatively attached to at least one of the spokes to initiate movement of a liquid between a distal location and a proximal location relative to the rotational axis, each of the liquid transfer modules comprising:
  - a first tank located on the at least one of the spokes positioned radially outward with respect to the rotational axis, the first tank comprising a first tank inlet that discharges into the first tank, a first pump operatively attached to a first tank outlet, and a first float switch to selectively enable the first pump,
  - a second tank located on the at least one of the spokes positioned radially inward with respect to the rotational axis comprising a second tank inlet that discharges into the second tank, a second pump operatively attached to a second tank outlet, and a second float switch to selectively enable the second pump,
  - a first liquid conduit connecting the first tank outlet to the second tank inlet and permitting a liquid to flow from the first tank to the second tank via selective activation of the first pump, and
  - a second liquid conduit connecting the second tank outlet to the first tank inlet and permitting the liquid to flow from the second tank to the first tank via selective activation of the second pump;
- (c) selectively decreasing a dynamic moment of inertia by pumping the liquid from the first tank to the second tank to increase radial inward motion upon activation of the first float switch; and
- (d) selectively increasing the dynamic moment of inertia by pumping the liquid from the second tank to the first tank to increase radial outward motion upon activation of the second float switch;

wherein the liquid transfer system rotates about a direction of travel about the rotational axis; and wherein each of the spokes are spaced about the hub such to have substantially equal angular distance therebetween.

16. The method of claim 15, wherein the at least two liquid transfer modules is comprised of at least two liquid transfer modules that are oriented to be diametrically opposed with respect to the rotational axis;

wherein the at least two liquid transfer modules contain approximately equal quantities of the liquid to balance each other about the rotational axis.

17. The method of claim 15, further comprising:
- (e) rotating counterweights operatively attached to at least some of the spokes, the counterweights being balanced and diametrically opposed about the rotational axis to provide a static moment of inertia.

* * * * *